(12) United States Patent
Kikuchi et al.

(10) Patent No.: US 12,119,034 B2
(45) Date of Patent: Oct. 15, 2024

(54) METHOD OF PRODUCING MULTILAYER OPTICAL RECORDING MEDIUM AND DEVICE FOR PRODUCING MULTILAYER OPTICAL RECORDING MEDIUM

(71) Applicant: SONY GROUP CORPORATION, Tokyo (JP)

(72) Inventors: Minoru Kikuchi, Tokyo (JP); Takeshi Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/551,479

(22) PCT Filed: Feb. 9, 2022

(86) PCT No.: PCT/JP2022/005005
§ 371 (c)(1),
(2) Date: Sep. 20, 2023

(87) PCT Pub. No.: WO2022/209323
PCT Pub. Date: Oct. 6, 2022

(65) Prior Publication Data
US 2024/0161779 A1    May 16, 2024

(30) Foreign Application Priority Data
Mar. 31, 2021    (JP) ................................. 2021-059340

(51) Int. Cl.
*G11B 7/24038* (2013.01)
*G11B 7/24027* (2013.01)
*G11B 7/26* (2006.01)

(52) U.S. Cl.
CPC ...... *G11B 7/24038* (2013.01); *G11B 7/24027* (2013.01); *G11B 7/26* (2013.01)

(58) Field of Classification Search
CPC ... G11B 7/24038; G11B 7/24027; G11B 7/26; G11B 7/004; G11B 7/24018
See application file for complete search history.

(56) References Cited

U.S. PATENT DOCUMENTS

| 6,258,432 B1 * | 7/2001 | Terada ..................... G11B 7/26 428/64.2 |
| 6,735,166 B1 * | 5/2004 | Kusafuka ................. G11B 7/26 |
| 2003/0001943 A1 * | 1/2003 | Hirotsune .......... G11B 7/24094 |

FOREIGN PATENT DOCUMENTS

| JP | 01-258247 A | 10/1989 |
| JP | 2002-245692 A | 8/2002 |

(Continued)

OTHER PUBLICATIONS

International Search Report and Written Opinion of PCT Application No. PCT/JP2022/005005, issued on Apr. 26, 2022, 9 pages of ISRWO.

*Primary Examiner* — Andrew Sasinowski
(74) *Attorney, Agent, or Firm* — CHIP LAW GROUP

(57) ABSTRACT

There is provided a method of producing a multilayer optical recording medium through which the occurrence of burrs is reduced. The method of producing a multilayer optical recording medium includes, when a UV curable adhesive is interposed between a first disk and a second disk, the first disk and the second disk are rotated, and when at least one of the vicinities of inner circumferential edges and the vicinities of outer circumferential edges of the first disk and the second disk is masked with a mask member, emitting ultraviolet rays for preliminarily curing the UV curable adhesive from the side of a light emission surface of the first disk during rotation.

9 Claims, 25 Drawing Sheets

(56) References Cited

FOREIGN PATENT DOCUMENTS

| | | |
|---|---|---|
| JP | 2003-067975 A | 3/2003 |
| JP | 3126267 U | 10/2006 |
| JP | 2007-226854 A | 9/2007 |
| JP | 2009-064513 A | 3/2009 |
| JP | 2015-197936 A | 11/2015 |
| WO | 2007/077885 A1 | 7/2007 |

* cited by examiner

METHOD OF PRODUCING MULTILAYER OPTICAL RECORDING MEDIUM AND DEVICE FOR PRODUCING MULTILAYER OPTICAL RECORDING MEDIUM

CROSS REFERENCE TO RELATED APPLICATIONS

This application is a U.S. National Phase of International Patent Application No. PCT/JP2022/005005 filed on Feb. 9, 2022, which claims priority benefit of Japanese Patent Application No. JP 2021-059340 filed in the Japan Patent Office on Mar. 31, 2021. Each of the above-referenced applications is hereby incorporated herein by reference in its entirety.

TECHNICAL FIELD

The present disclosure relates to a method of producing a multilayer optical recording medium and a device for producing a multilayer optical recording medium.

BACKGROUND ART

In recent years, in order to increase the recording capacity of optical recording media, techniques for increasing the number of information signal layers have been widely used. As one method, a technique for increasing the recording capacity by bonding a plurality of (for example, two) optical recording mediums has been proposed (for example, refer to PTL 1).

CITATION LIST

Patent Literature

[PTL 1]
JP 2009-064513A

SUMMARY

Technical Problem

In such a technical field, it is desirable to reduce warpage of disks after bonding and for there to be as little protrusion (hereinafter appropriately referred to as a burr) as possible on the disks after bonding.

An object of the present disclosure is to provide a method of producing a multilayer optical recording medium and a device for producing a multilayer optical recording medium through which it is possible to reduce warpage of disks after bonding and reduce the occurrence of burrs in disks after bonding.

Solution to Problem

The present disclosure provides, for example, a method of producing a multilayer optical recording medium including, when a UV curable adhesive is interposed between a first disk and a second disk, the first disk and the second disk are rotated, and when at least one of the vicinities of inner circumferential edges and the vicinities of outer circumferential edges of the first disk and the second disk is masked with a mask member, emitting ultraviolet rays for preliminarily curing the UV curable adhesive from the side of a light emission surface of the first disk during rotation.

The present disclosure provides, for example, a device for producing a multilayer optical recording medium including
an emission member that emits ultraviolet rays;
a holding unit that holds a first disk and a second disk that are laminated; and
a mask member that masks at least one of the vicinities of inner circumferential edges and the vicinities of the outer circumferential edges of the first disk and the second disk,
wherein, when a UV curable adhesive is interposed between the first disk and the second disk, the first disk and the second disk held by the holding unit are rotated, and
wherein, when at least one of the vicinities of the inner circumferential edges and the vicinities of the outer circumferential edges of the first disk and the second disk is masked with the mask member, ultraviolet rays for preliminarily curing the UV curable adhesive are emitted from the emission member from the side of a first main surface of the first disk during rotation.

DESCRIPTION OF EMBODIMENTS

Figure 1:
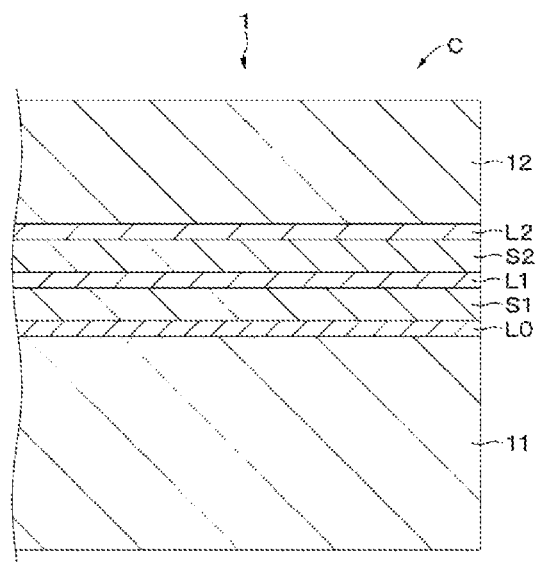
FIG. 1 is a diagram showing a cross section of one disk constituting a multilayer optical recording medium.

Embodiments of the present disclosure will be described in the following order with reference to the drawings. Here, in all drawings of the following embodiments, the same or corresponding parts are denoted by the same reference numerals, and redundant descriptions are omitted appropriately.

<Technology Related to Present Disclosure>
[Multilayer Optical Recording Medium]

First, in order to facilitate understanding of the present disclosure, the technology related to the present disclosure (hereinafter appropriately referred to as a related technology) will be described. First, a multilayer optical recording medium that can be applied to the present disclosure will be described. For example, the multilayer optical recording medium is formed by bonding two disks. Of course, the multilayer optical recording medium may be formed by bonding three or more disks.

FIG. 1 is a partial cross-sectional view of one disk (a disk 1) constituting a multilayer optical recording medium. As the disk 1, for example, a multi-layer (for example, three recording layers) Blu-ray Disc (BD (registered trademark)) may be exemplified.

The disk 1 has a disk shape with an opening at the center (hereinafter appropriately referred to as a center hole). In addition, as shown in FIG. 1, the disk 1 has a configuration in which an information signal layer L0, an intermediate layer S1, an information signal layer L1, . . . , an intermediate layer Sn, an information signal layer Ln, and a light transmission layer 12 as a cover layer are laminated in this order on one main surface of a substrate 11. In this example, there are three information signal layers (L0 to L2), and two intermediate layers (S1, S2). The surface on the side of the light transmission layer 12 is a light emission surface C to which a laser beam for recording or reproducing an information signal is emitted to the information signal layers L0 to L2. The information signal layer L0 is provided at the deepest position with respect to the light emission surface C, and the information signal layers L1 and L2 are positioned thereabove. Therefore, the information signal layers L1 and L2 are formed to be able to transmit a laser beam used for recording or reproducing.

When a laser beam is emitted to the information signal layers L0 to L2 from the light emission surface C on the side of the light transmission layer 12, an information signal is recorded or reproduced. For example, when a laser beam with a wavelength range of 400 nm or more and 410 nm or less is condensed through an objective lens having a numerical aperture in a range of 0.84 or more and 0.86 or less, and is emitted to the information signal layers L0 to L2 from the side of the light transmission layer 12, an information signal is recorded or reproduced. For example, the information signal layers L0 to L2 have a recording capacity of 25 GB or more with respect to a wavelength of 405 nm and a numerical aperture NA of 0.85 of a condenser lens.

Hereinafter, the substrate 11, the information signal layers L0 to L2, the intermediate layers S1 and S2, and the light transmission layer 12 constituting the disk 1 will be described in order.

(Substrate)

The substrate 11 has, for example, a disk shape in which a center hole is provided in the center. The substrate 11 has an unevenness (not shown) on the inner circumferential part of the film formation surface. The information signal layer L0 is formed into a film on the uneven surface. In the following description, within the uneven surface, a concave part will be referred to as a land, and a convex part will be referred to as a groove, appropriately.

Examples of shapes of lands and grooves include various shapes such as a spiral shape and a concentric circle. In addition, for example, lands and/or grooves wobble (meander) in order to stabilize the linear velocity or add address information.

For example, the diameter of the substrate 11 is selected to be 120 mm. The thickness of the substrate 11 is selected in consideration of rigidity, and selected from about 0.5 mm to 1.0 mm, for example, 0.5 mm. In addition, for example, the diameter of the center hole is selected to be 15 mm.

As the material of the substrate 11, for example, a plastic material or glass can be used, and a plastic material is preferably used in consideration of cost. As the plastic material, for example, a polycarbonate resin, a polyolefin resin, an acrylic resin or the like can be used.

(Information Signal Layer)

The information signal layers L0 to L2 include, for example, a recording layer having an upper surface and a lower surface, a dielectric layer provided adjacent to the upper surface of the recording layer, and a dielectric layer provided adjacent to the lower surface of the recording layer. With such a configuration, it is possible to improve the storage reliability of the information signal layers L0 to L2. Here, the upper surface is the main surface between both main surfaces of the recording layer on the side to which a laser beam for recording or reproducing an information signal is emitted. The lower surface is the main surface on the side opposite to the above side to which a laser beam is emitted, that is, the main surface on the side of the substrate. The recording layer and the dielectric layer are examples of the inorganic layer.

(Recording Layer)

The recording layer has a configuration in which an information signal can be recorded by laser beam emission. Specifically, the recording layer has a configuration in which a recording mark can be formed by laser beam emission. The recording layer is an inorganic recording layer, and is mainly composed of a metal oxide as an inorganic recording material. Examples of metal oxides include an inorganic recording material containing manganese oxide (MnO-based material), an inorganic recording material containing palladium oxide (PdO-based material), an inorganic recording material containing copper oxide (CuO-based material) and an inorganic recording material containing silver oxide (AgO-based material).

The thickness of the recording layer is preferably 25 nm or more and 60 nm or less, and more preferably in a range of 30 nm or more and 50 nm or less.

(Dielectric Layer)

The dielectric layer functions as an oxygen barrier layer. Thereby, it is possible to improve durability of the recording layer. In addition, the dielectric layer may have a function of preventing oxygen of the recording layer from escaping. Thereby, it is possible to reduce a change in the film quality of the recording layer, and it is possible to secure a preferable film quality for the recording layer. In addition, the dielectric layer may have a function of improving recording characteristics.

The dielectric layer contains a dielectric. The dielectric includes, for example, at least one or more selected from the group consisting of oxides, nitrides, sulfides, carbides and fluorides. The same or different materials can be used as the material of the dielectric layer. Examples of oxides include oxides of one or more elements selected from the group consisting of In, Zn, Sn, Al, Si, Ge, Ti, Ga, Ta, Nb, Hf, Zr, Cr, Bi and Mg. Examples of nitrides include nitrides of one or more elements selected from the group consisting of In, Sn, Ge, Cr, Si, Al, Nb, Mo, Ti, Nb, Mo, Ti, W, Ta and Zn, and preferably nitrides of one or more elements selected from the group consisting of Si, Ge and Ti. Examples of sulfides include Zn sulfide. Examples of carbides include carbides of one or more elements selected from the group consisting of In, Sn, Ge, Cr, Si, Al, Ti, Zr, Ta and W, and preferably carbides of one or more elements selected from the group consisting of Si, Ti and W. Examples of fluorides include fluorides of one or more elements selected from the group consisting of Si, Al, Mg, Ca and La. Specific examples of these mixtures include $ZnS$—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $In_2O_3$—$Ga_2O_3$—$ZnO$ (IGZO), $Sn_2O_3$—$Ta_2O_5$ (TTO), $TiO_2$—$SiO_2$, $Al_2O_3$—$ZnO$, and $Al_2O_3$—$BaO$.

The thickness of the dielectric layer is preferably in a range of 2 nm or more and 30 nm or less. The thickness of the dielectric layer is preferably in a range of 2 nm or more and 50 nm or less.

(Intermediate Layer)

The intermediate layers S1 and S2 have a function of physically and optically separating the information signal layers L0 to L2 with a sufficient distance, and have uneven surfaces on their surfaces. On the uneven surface, for example, concentric or spiral lands and grooves are formed. The thickness of the intermediate layers S1 and S2 is preferably set between 9 μm and 50 μm. The material of the intermediate layers S1 and S2 is not particularly limited, and it is preferable to use a UV curable acrylic resin. In addition, the intermediate layers S1 and S2 preferably have a sufficiently high light transmittance because they serve as an optical path for a laser beam for recording or reproducing an information signal toward the deeper-side layer.

(Light Transmission Layer)

The light transmission layer 12 is, for example, a resin layer obtained by curing a photosensitive resin such as a UV curable resin. Examples of materials of the resin layer include a UV curable acrylic resin. In addition, the light transmission layer 12 may be composed of a light-transmitting sheet having an annular shape and an adhesion layer for bonding the light-transmitting sheet to the substrate 11. The light-transmitting sheet is preferably made of a material having low absorptivity with respect to a laser beam used for recording and reproducing, and specifically, is preferably made of a material having a transmission of 90% or more. As the material of the light-transmitting sheet, for example, a polycarbonate resin material, a polyolefin resin (for example, ZEONEX (registered trademark)) or the like can be used. As the material of the adhesion layer, for example, a UV curable resin, a pressure sensitive adhesive (PSA) or the like can be used.

The thickness of the light transmission layer 12 is preferably selected from the range of 10 μm or more and 177 μm or less, and for example, 100 μm is selected. When such a thin light transmission layer 12 is combined with, for example, an objective lens with a high numerical aperture (NA) of about 0.85, high-density recording can be achieved.

The thickness of the structure including the information signal layers L0 to L2, the intermediate layers S1 and S2 and the light transmission layer 12 is, for example, about 0.1 to 0.3 mm. The total thickness of the disk 1 is, for example, about 0.6 mm.

Figure 2:
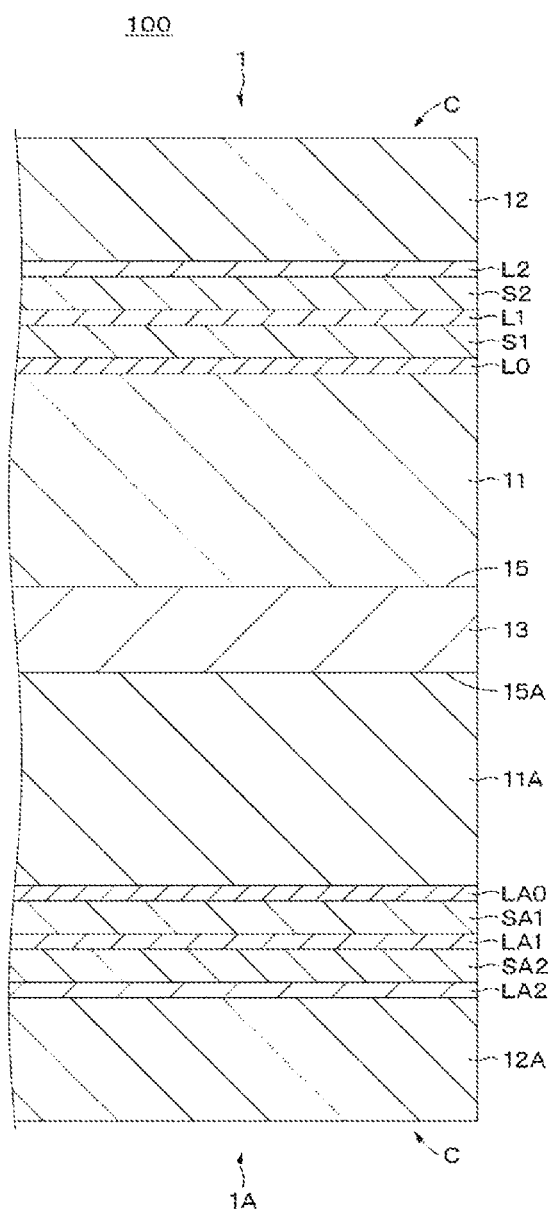
FIG. 2 is a diagram showing a cross section of an example of the multilayer optical recording medium.

As shown in FIG. 2, a multilayer optical recording medium (a multilayer optical recording medium 100) according to the present embodiment is formed by bonding the disk 1 and a disk (a disk 1A) having the same configuration as the disk 1. The disk 1A includes a substrate 11A corresponding to the substrate 11, information signal layers LA0 to LA2 corresponding to the information signal layers L0 to L2, an intermediate layer SA1 and an intermediate layer SA2 corresponding to the intermediate layer S1 and the intermediate layer S2, a light transmission layer 12A corresponding to the light transmission layer 12, and a light emission surface CA. An adhesive layer 13 is provided between surfaces 15 and 15A facing the substrates 11 and 11 of the disks 1 and 1A, and the disks 1 and 1A are bonded by the adhesive layer 13. Specifically, the substrate 11 of the disk 1 and the substrate 11A of the disk 1A are bonded so that the light transmission layers 12 and 12A are on the surface side.

The adhesive layer 13 contains a cured UV curable resin, for example, at least one of an acrylic resin and an epoxy resin. The thickness of the adhesive layer 13 is, for example, 0.01 mm or more and 0.22 mm or less. As will be described below, the adhesive constituting the adhesive layer 13 is stretched by a spin coating method.

Figure 3:
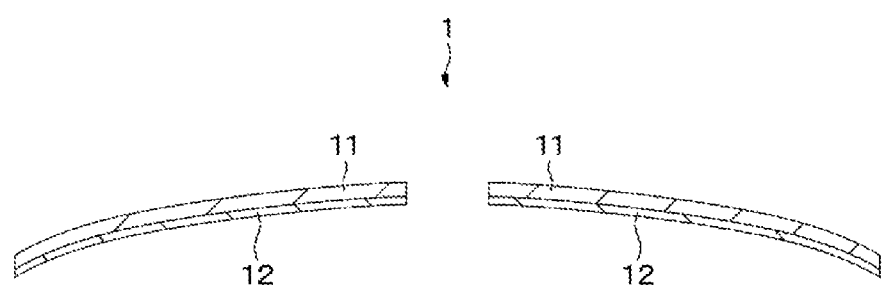
FIG. 3 is a diagram schematically showing warpage of one disk.

Here, as shown in FIG. 3, in the disk 1 before bonding, large warpage that deforms the surface on the side on which the light transmission layer 12 is provided into a concave shape is generated. This is because, in the disk 1, when a UV curable resin that forms the light transmission layer 12 and an intermediate layer (not shown) is cured, the UV curable resin contracts, and a stress that pulls the substrate 11 is exerted. Here, in FIG. 3 and the drawings used for the following description, the configuration of the information signal layer and the intermediate layer may be appropriately omitted, and only the light transmission layer 12 may be shown.

Figure 4:
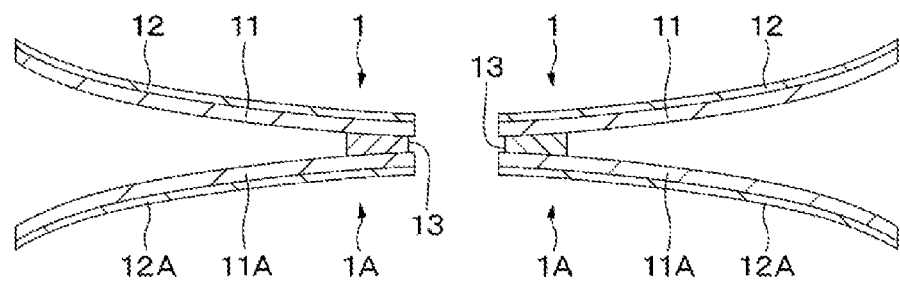
FIG. 4 is a diagram schematically showing warpage of the multilayer optical recording medium.
Figure 5:
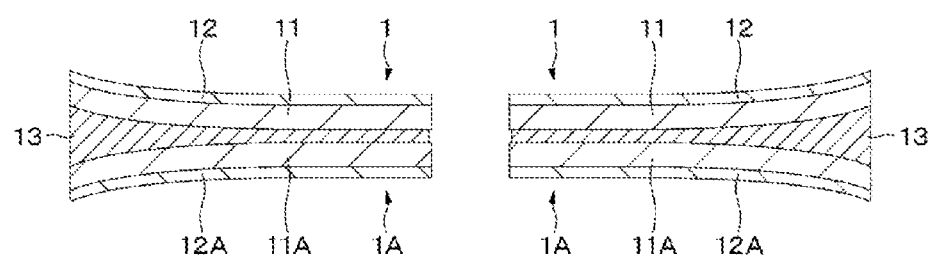
FIG. 5 is a diagram schematically showing warpage of the multilayer optical recording medium.
Figure 6:
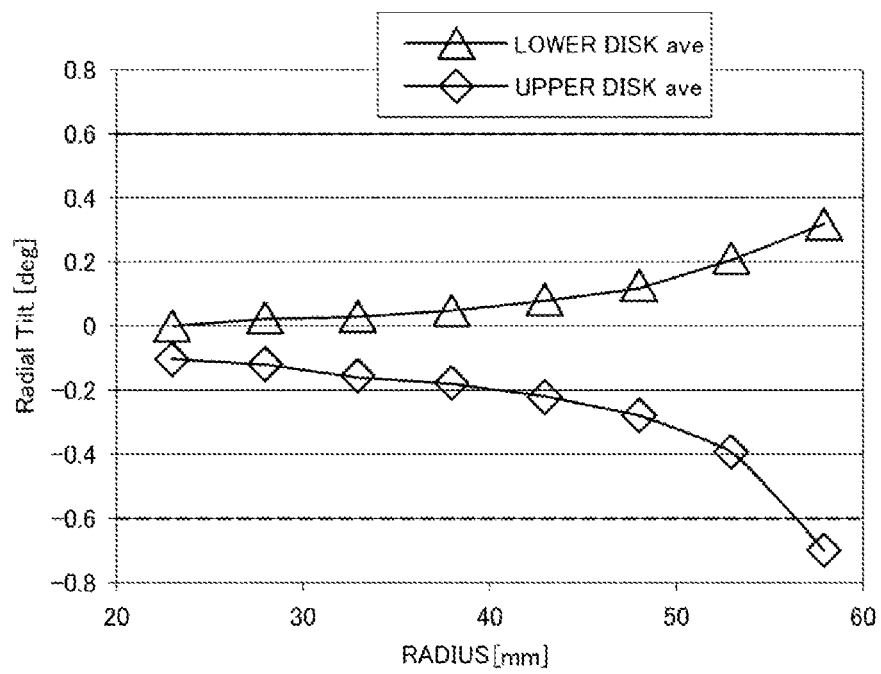
FIG. 6 is a diagram for illustrating that a radial tilt does not fall within a predetermined range due to warpage of the multilayer optical recording medium.

Therefore, as shown in FIG. 4, when the two disks 1 and 1A are superimposed so that mutual substrates 11 and 11A face each other and the adhesive layer 13 is interposed between the inner circumferential parts of these disks 1 and 1A, the outer circumferential parts of the two disks 1 and 1A are opened. In order to bond two disks with high warpage, a shaking-off step of stretching and applying the supplied adhesive is performed at a high speed, and thus the two disks become nearly flat due to a centrifugal force acting on them. However, if high-speed rotation stops, the centrifugal force disappears, and a force with which the outer circumference is separated is generated in the two disks. If the time after high-speed rotation until adhesive curing (UV emission) becomes longer, the outer circumferences of the two disks begin to open. Even if UV emission is performed in this mode, the disk has an open outer circumference, that is, has a large radial tilt (an angle formed by incident light and reflected light). This mode is schematically shown in FIG. 5. As shown in FIG. 6, the radial tilt of the multilayer optical recording medium after bonding does not fall within a standard range (for example, the standard required for a multilayer optical recording medium with a radius r of 58 mm) of −0.6 deg to 0.6 deg.

Example of Method of Producing Multilayer Optical Recording Medium

In order to improve such points, a step of preliminarily curing an adhesive constituting the adhesive layer 13 by performing UV emission during high-speed rotation of the two disks 1 and 1A (this is a step of adjusting the intensity and amount of ultraviolet rays to the extent that it is not completely cured and then performing emission, hereinafter also appropriately referred to as a preliminary UV curing step) is performed and thus the adhesive is cured while the disks 1 and 1A are fixed in a nearly flat shape. Thereby, the bonded disks 1 and 1A, that is, the multilayer optical recording medium, can have favorable Radial-Tilt characteristics.

Hereinafter, with reference to FIGS. 7A, 7B, 7C, 7D, 8A, and 8B, an example of a method of producing the multilayer optical recording medium 100 including a preliminary UV curing step will be described. Here, steps shown in FIGS. 7A, 7B, 7C, and 7D and steps shown in FIGS. 8A and 8B are steps that are continuously performed.

Figure 7A:
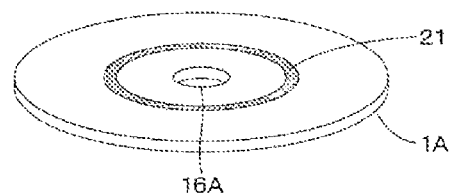
FIGS. 7A, 7B, 7C, and 7D are diagrams for illustrating an example of a method of producing a multilayer optical recording medium in the related technology.
Figure 7B:
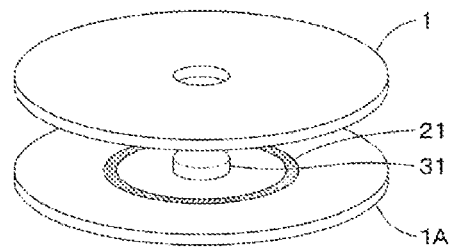
Figure 7C:
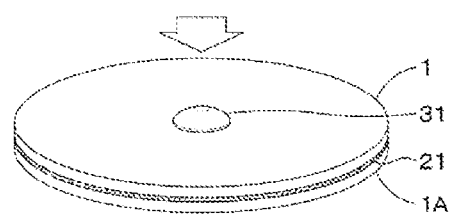
Figure 7D:
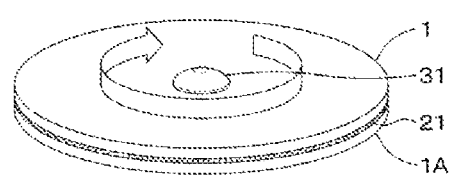

As shown in FIG. 7A, a UV curable adhesive 21 is annularly supplied to an adhesive supply surface (surface on the side opposite to the side on which the light transmission layer 12A or the like is formed) of a lower disk (for example, the substrate 11A of the disk 1A) (adhesive supply step). Then, as shown in FIG. 7B, the disk 1A is positioned by inserting a center pin 31 into a center hole 16A of the disk 1A. The disk 1, which is the upper disk, is superimposed on the disk 1A (superimposing step). Then, the disk 1 is pressed in the direction indicated by the arrow in FIG. 7C until the thickness of the adhesive layer 13 reaches a predetermined thickness (for example, about 30 μm to 50 μm) (pressing step). Next, as shown in FIG. 7D, the disks 1 and 1A are rotated at a high speed, and the adhesive 21 is stretched and applied (shaking-off step).

Figure 8A:
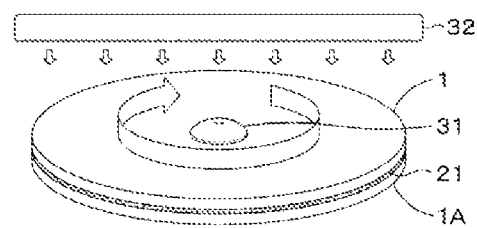
FIGS. 8A and 8B are diagrams for illustrating an example of the method of producing a multilayer optical recording medium in the related technology.
Figure 8B:
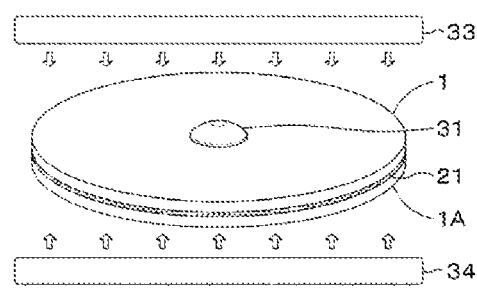

After the shaking-off step, as shown in FIG. 8A, a UV emission lamp 32 is brought close to the disk 1, and a small amount of (an amount at which the adhesive 21 is not mainly cured) of ultraviolet rays is emitted. Thereby, the adhesive 21 is preliminarily cured (preliminary UV curing step). Next, as shown in FIG. 8B, the disk is moved to the next stage, a sufficient amount of ultraviolet rays is emitted from UV emission lamps 33 and 34 in the vertical direction, and thus the adhesive 21 is mainly cured (main UV curing step).

Figure 9:
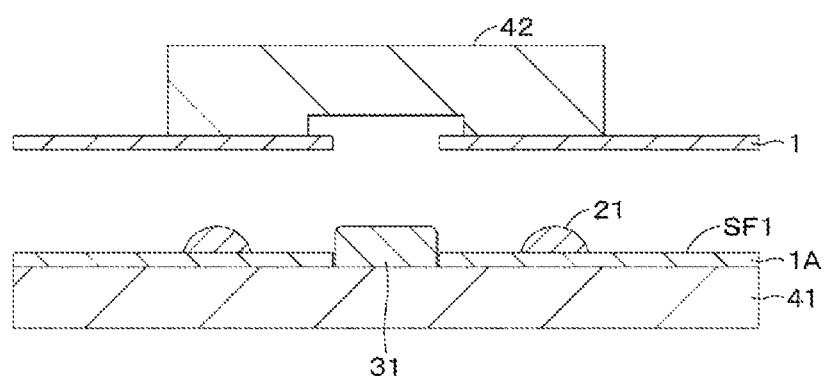
FIG. 9 is a diagram for illustrating an example of an adhesive supply step.

Hereinafter, the above steps will be described in detail. As shown in FIG. 9, in the adhesive supply step, the disk 1A is placed on a stage 41. In this case, the center pin 31 is inserted into a center hole 16 of the disk 1A. The UV curable adhesive 21 is annularly supplied to an adhesive supply surface SF1 of the substrate 11A of the disk 1A. In this case, as shown in FIG. 9, the disk 1 is sucked and held by a press head 42.

Figure 10:
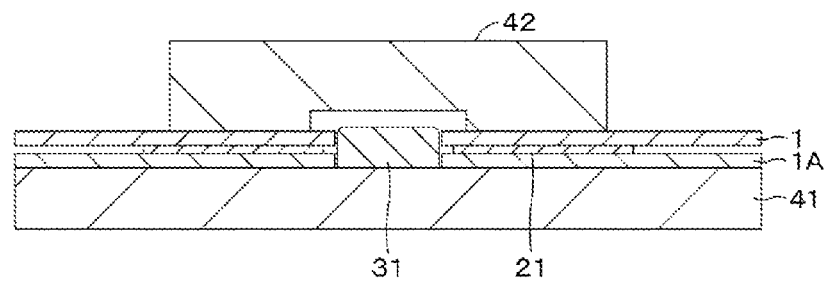
FIG. 10 is a diagram for illustrating an example of a superimposing step and a pressing step.

FIG. 10 shows the mode of the superimposing step and the pressing step. When the press head 42 is lowered, the disk 1 is superimposed on the disk 1A. Then, if the press head 42 is further lowered, the disk 1 is pressed and the adhesive 21 spreads to the middle circumference. For example, pressing is performed until the thickness of the layer formed of the adhesive 21 is about 50 μm. In addition, the radius of supply of the adhesive 21 is optimized so that the adhesive 21 does not protrude from the inner circumferential hole during pressing.

Figure 11:
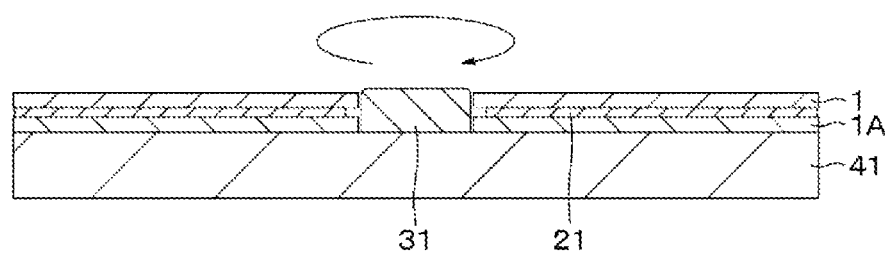
FIG. 11 is a diagram for illustrating an example of a shaking-off step.

FIG. 11 shows the mode of the shaking-off step. In the shaking-off step, the stage 41 is rotated at a high speed, and thus the adhesive 21 spreads to the outer circumference.

Figure 12:
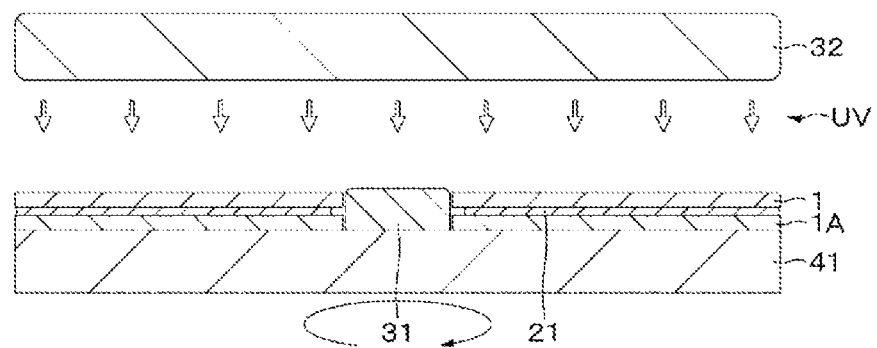
FIG. 12 is a diagram for illustrating a preliminary UV curing step in the related technology.
Figure 13:
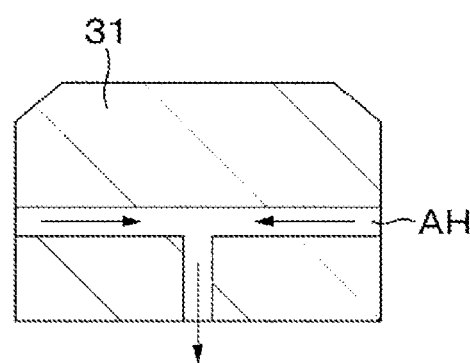
FIG. 13 is a diagram for illustrating suction by a center pin.

FIG. 12 shows the mode of the preliminary UV curing step. In the shaking-off step, while the stage 41 is rotated at a high speed, the UV emission lamp 32 is brought close to the disk 1, and from the side of the light emission surface C of the disk 1, the UV emission lamp 32 emits ultraviolet rays to the extent that the adhesive 21 is preliminarily cured. Thereby, as shown in FIG. 12, the two disks are fixed in a flat shape with the centrifugal force. Here, as shown in FIG. 13, in the shaking-off step and the preliminary UV curing step, air is sucked from a suction hole AH of the center pin 31. Thereby, the inner circumferential parts of the two disks are closed and air bubbles are prevented from entering the adhesive 21.

Figure 14:
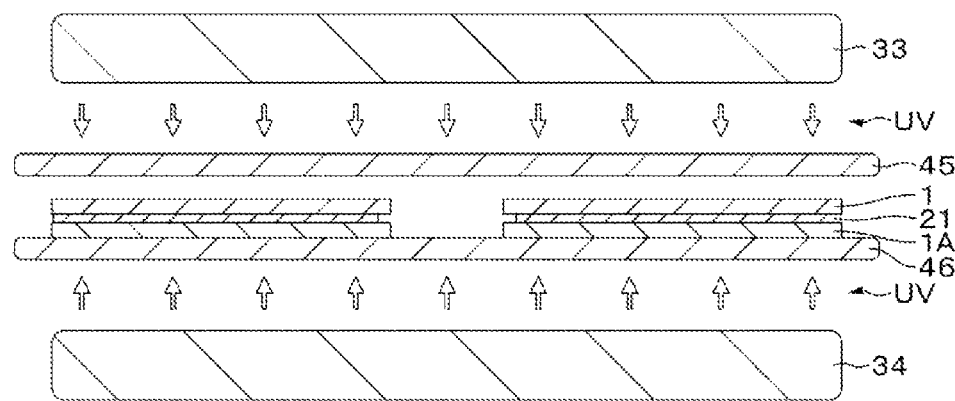
FIG. 14 is a diagram for illustrating an example of a main UV curing step.

FIG. 14 shows the mode of the main UV curing step. When a quartz mask 45 is interposed between the UV emission lamp 33 and the disk 1, and a quartz table 46 is interposed between the UV emission lamp 34 and the disk 1A, the UV emission lamps 33 and 34 emit strong ultraviolet rays to the extent that the adhesive 21 is mainly cured.

Figure 15:
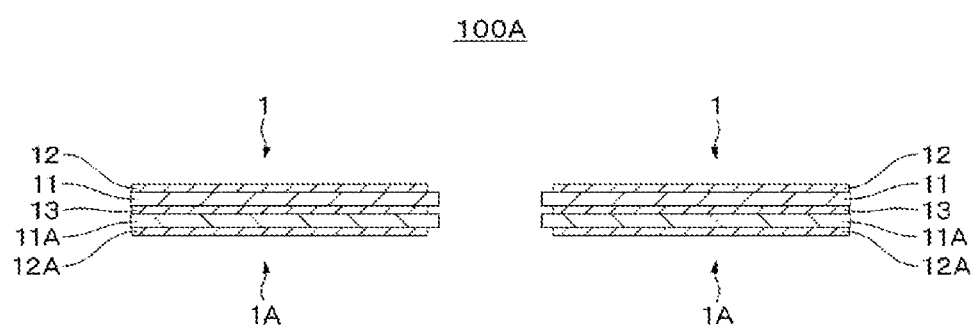
FIG. 15 is a diagram showing a multilayer optical recording medium produced by the method of producing a multilayer optical recording medium in the related technology.
Figure 16:
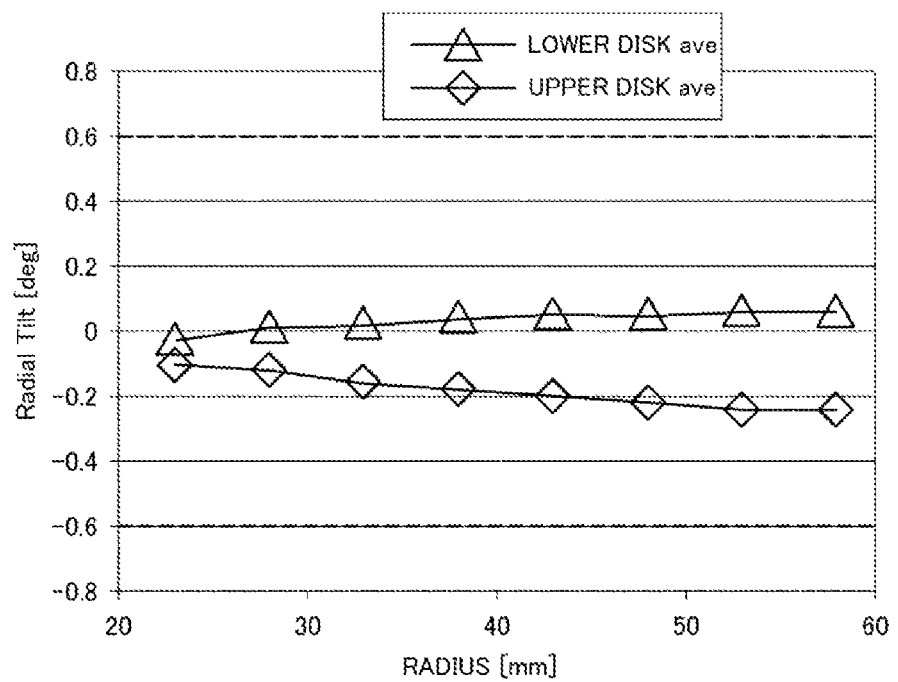
FIG. 16 is a diagram for illustrating that a radial tilt of the multilayer optical recording medium shown in FIG. 15 falls within a predetermined range.

FIG. 15 shows the multilayer optical recording medium 100A produced in a process including a preliminary UV curing step. When the process includes the preliminary UV curing step, the outer circumference of the disk is not opened and a flat multilayer optical recording medium is obtained. As shown in FIG. 16, the radial tilt of the multilayer optical recording medium 100A is within a standard range of −0.6 deg to 0.6 deg.

[Issues to be Considered in Present Disclosure]

Figure 17A:
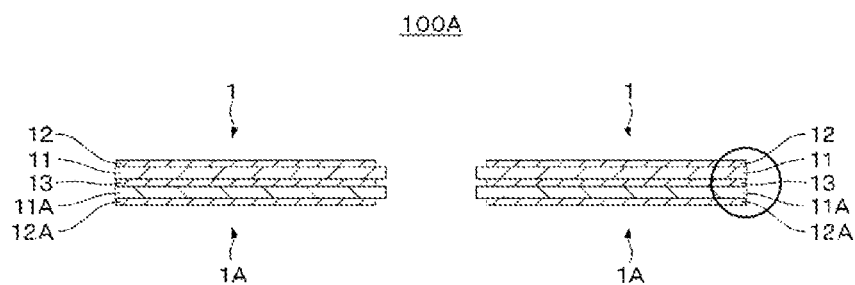
FIGS. 17A and 17B are diagrams for illustrating issues to be considered in the present disclosure.
Figure 17B:
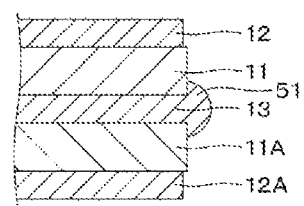

However, when UV emission is performed in the preliminary UV curing step during high-speed rotation in the shaking-off step, the adhesive 21 that scatters from the outer circumferential end is cured, and thus burrs occur. That is, as schematically shown in FIGS. 17A and 17B, burrs 51 occur at the outer circumferential end of the adhesive layer 13. When the burrs 51 occur, there is an adverse effect of increasing the outer diameter of the multilayer optical recording medium, and the burrs 51 may peel off during use of the multilayer optical recording medium and contaminate the disk drive. Therefore, a method of producing a multilayer optical recording medium without the occurrence of burrs 51 is desirable. Hereinafter, an embodiment of the present disclosure made in view of such points will be described in detail.

One Embodiment

Overview of One Embodiment

Figure 18:
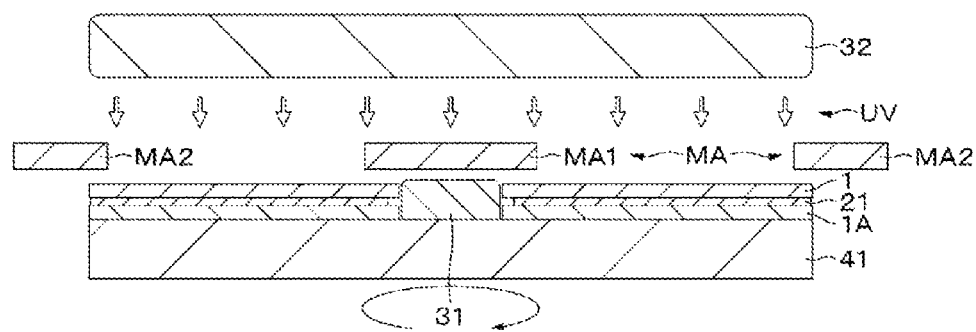
FIG. 18 is a diagram for illustrating an overview of one embodiment.

FIG. 18 shows an overview of one embodiment. In the present embodiment, in the preliminary UV curing step, a mask member MA is interposed between the UV emission lamp 32 and the disks 1 and 1A. The mask member MA includes an inner circumferential mask MA1 that masks the vicinity of the inner circumferential ends of the disks 1 and 1A and an outer circumferential mask MA2 that masks the vicinity of the outer circumferential ends of the disks 1 and 1A. If the mask member MA is inserted, the occurrence of burrs 51 is prevented.

Figure 19:
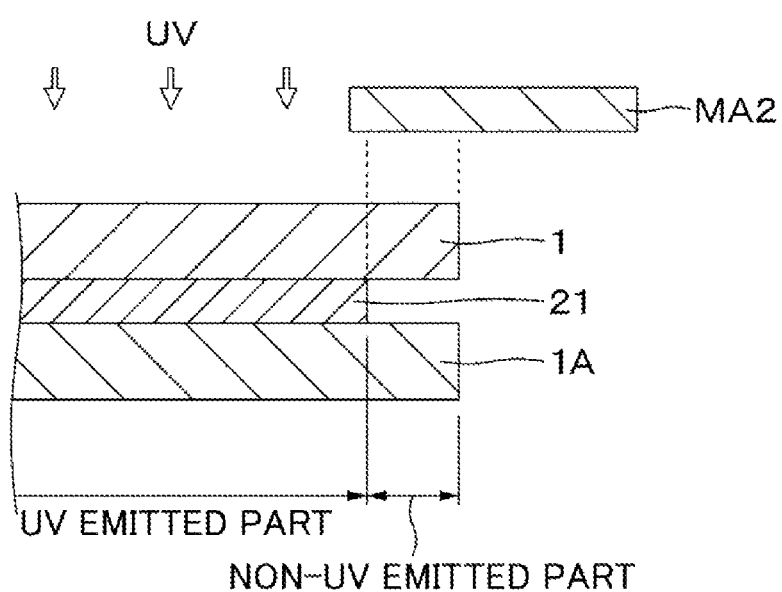
FIG. 19 is a diagram for illustrating an overview of one embodiment.

That is, as shown in FIG. 19, if the outer circumferential mask MA2 for preventing UV emission is installed in the outer circumferential area of the adhesive 21 during the preliminary UV curing step, it is possible to prevent ultraviolet rays from being emitted to the adhesive 21 that scatters outside the disks 1 and 1A. That is, since the adhesive 21 is not cured, the occurrence of burrs 51 can be prevented.

Figure 20:
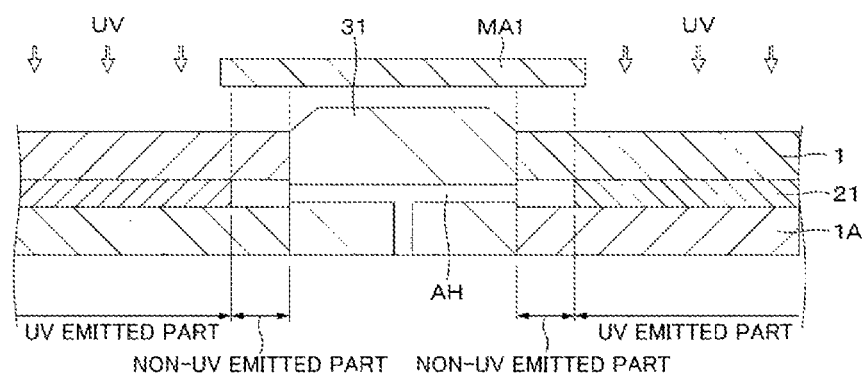
FIG. 20 is a diagram for illustrating an overview of one embodiment.

In addition, as shown in FIG. 20, if the inner circumferential mask MA1 for preventing UV emission is installed in the inner circumferential area of the adhesive 21, since the adhesive 21 is not cured even when the adhesive 21 is sucked up to the suction hole AH of the center pin 31, it is possible to prevent the disks 1 and 1A from adhering to the center pin 31 via the adhesive 21.

[Configuration Example of Production Device]

Figure 21:
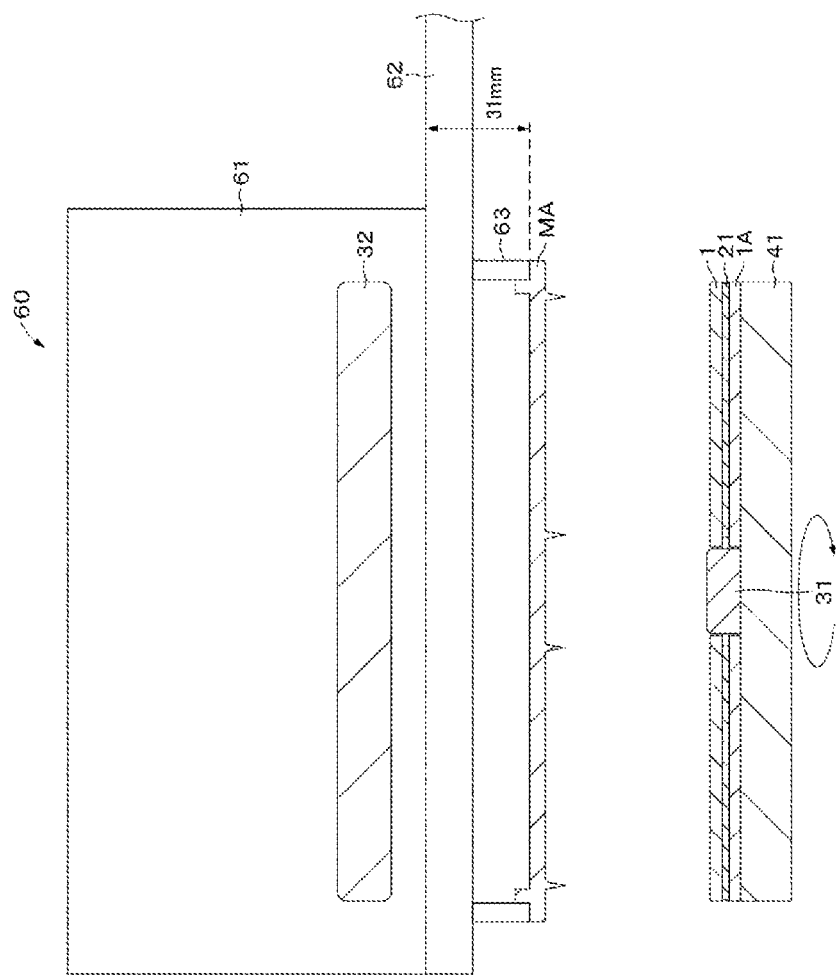
FIG. 21 is a diagram for illustrating a configuration example of a production device according to one embodiment.

FIG. 21 shows a configuration example of a device for producing a multilayer optical recording medium (a production device 60) according to the present embodiment. The production device 60 has a lamp house 61, and the UV emission lamp 32 is held in the lamp house 61. In addition, a mounting arm 62 is attached to the lamp house 61, and the mask member MA is attached to the mounting arm 62 via a mask member fixing sleeve 63. The lamp house 61 can be driven in the vertical direction in FIG. 21 by an appropriate driving device such as a linear motor (not shown). With the above configuration, the mask member MA also moves vertically in conjunction with the vertical movement of the lamp house 61, in other words, the UV emission lamp 32. The distance between the bottom surface of the lamp house 61 and the upper surface of the mask member MA is set to, for example, about 25 mm to 35 mm (for example, 31 mm). The stage 41 with the center pin 31 provided is arranged on the side facing the mask member MA.

Figure 22:
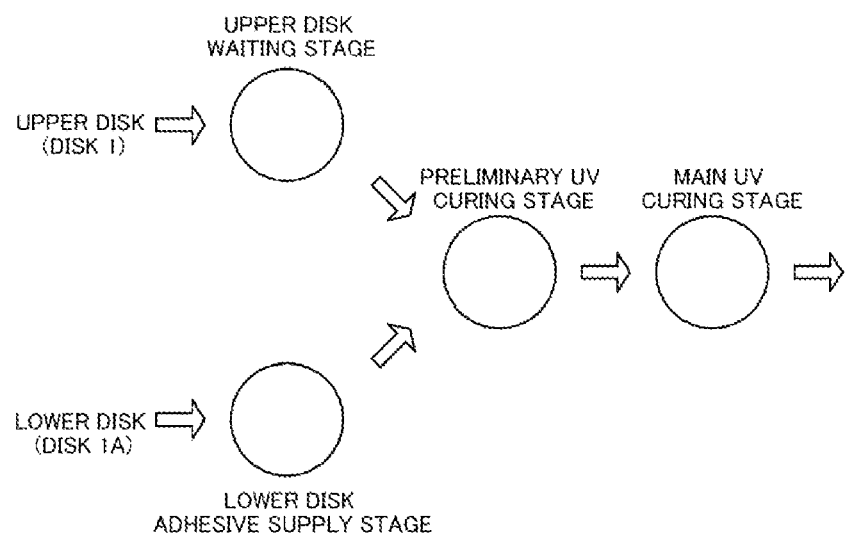
FIG. 22 is a diagram for illustrating a configuration example of a production device according to one embodiment.

FIG. 22 shows stages of the production device 60. An upper disk (in this example, the disk 1) and a lower disk (in this example, the disk 1A) are transported to stages used in respective steps by an appropriate driving device such as an articulated robot. For example, the disk 1 is placed on a waiting stage, and the disk 1A is placed on an adhesive supply stage. After the adhesive 21 is supplied to the disk 1A placed on the adhesive supply stage, the disk 1A is transported to a stage in which a preliminary UV curing step is performed (preliminary UV curing stage). Then, the disk 1 placed on the waiting stage is transported to the preliminary UV curing stage, and a superimposing step, a pressing step, and a preliminary UV curing step are performed. Then, the two disks 1 and 1A are transported to a stage in which a main UV curing step is performed (main UV curing stage), and the main UV curing step is performed using the stage.

Figure 23A:
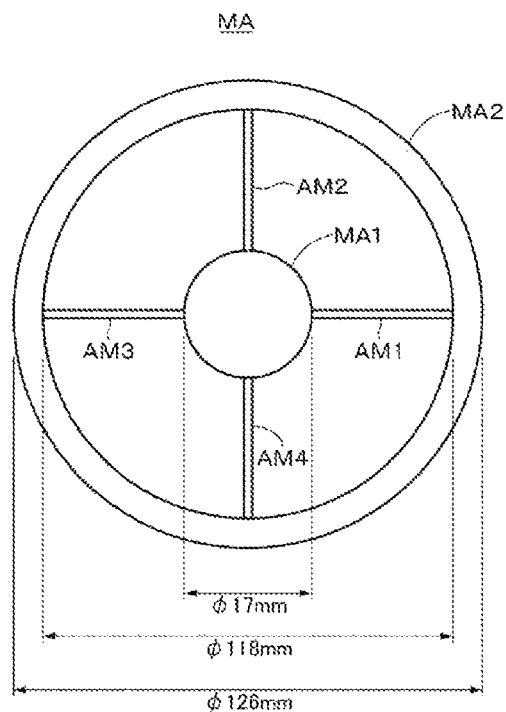
FIGS. 23A and 23B are diagrams for illustrating examples of a shape and an arrangement position of a mask member according to one embodiment.
Figure 23B:
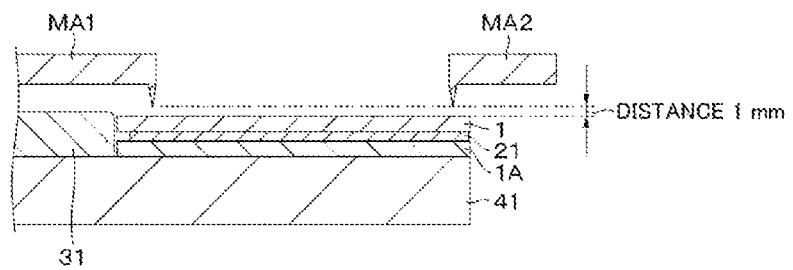

FIG. 23A shows an example of the mask member MA according to the present embodiment. The mask member MA includes a substantially circular inner circumferential mask MA1 and a ring-shaped outer circumferential mask MA2 arranged outside the inner circumferential mask MA1. The inner circumferential mask MA1 and the outer circumferential mask MA2 are connected by, for example, four cross-shaped arm parts (arm parts AM1 to AM4). The diameter of the inner circumferential mask MA1 is set to about 12 to 20 mm (for example, 17 mm), the inner diameter of the outer circumferential mask MA2 is set to about 115 to 120 mm (for example, 118 mm), and the outer diameter of the outer circumferential mask MA2 is set to about 120 to 130 mm (for example, 126 mm). As shown in FIG. 23B, when masking with the mask member MA is performed, the mask member MA is arranged at a position about 1 mm from the upper surface of the upper disk (the disk 1).

[Preliminary UV Curing Step in Present Embodiment]

Next, the preliminary UV curing step in the present embodiment will be described. Since details of other steps are the same as those described in the related technology, redundant descriptions are omitted appropriately.

Figure 24:
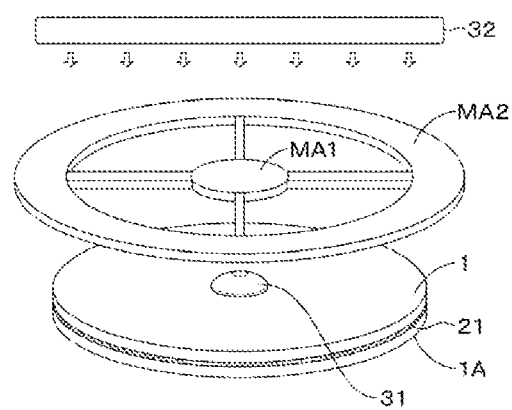
FIG. 24 is a diagram for illustrating a preliminary UV curing step according to one embodiment.

As shown in FIG. 24, in the preliminary UV curing step, when the mask member MA is arranged, the UV emission lamp 32 emits ultraviolet rays to the extent that the adhesive 21 is preliminarily cured.

Figures 25A, 25B:
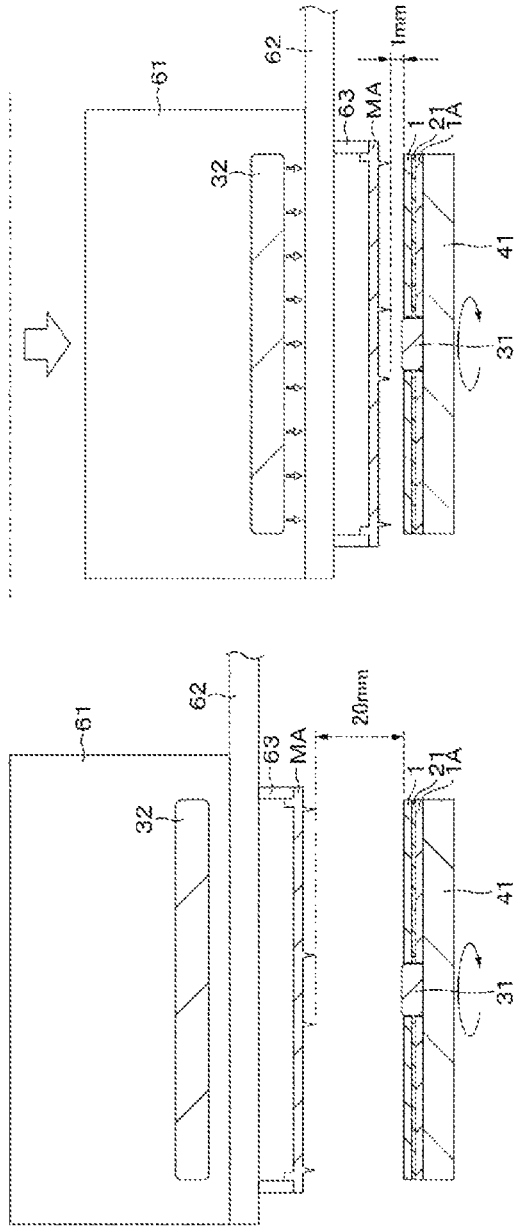
FIGS. 25A and 25B are diagrams for illustrating a preliminary UV curing step according to one embodiment.

For example, in the initial state, as shown in FIG. 25A, the lamp house 61 waits at a position about 20 mm from the upper surface of the disk 1. Then, when the shaking-off step starts, the lamp house 61 and the mask member MA are lowered together by operating a driving device (not shown). For example, if the distance between the mask member MA and the disk 1 is set to a set value (for example, 1 mm) using a sensor (not shown) such as an imaging sensor, the operation of the driving device stops, and the lamp house 61 stops. Then, the UV emission lamp 32 emits ultraviolet rays to the extent that the adhesive 21 is preliminarily cured.

EXAMPLES

Next, the present disclosure will be described in more detail with reference to examples. Here, the present disclosure is not limited to the following examples. The UV curable adhesive used in this example, the UV emission lamp used in the preliminary UV curing step, the UV emission lamp used in the main UV curing step, the shaking-off rotation speed (rotation speed of the disks 1 and 1A) in the preliminary UV curing step, the number of ultraviolet ray emissions in the preliminary UV curing step, and the number of upper and lower UV emissions in the main UV curing step are as shown in the following Table 1.

TABLE 1

| | |
|---|---|
| UV curable adhesive | SK6000 series (commercially available from Dexerials Corporation) |
| UV emission lamp (preliminary curing) | RC-801 (commercially available from Xenon) |
| UV emission lamp (main curing) | RC-801 (commercially available from Xenon) |
| Shaking-off rotation speed during preliminary curing | 7,000 rpm |
| Number of UV emissions during preliminary curing | 2 pls (pulse) |
| Number of main UV curing emissions | Upper: 10 pls (pulse), lower: 10 pls (pulse) |

First, for an example in which a multilayer optical recording medium was produced in a step including no preliminary UV curing step, an example in which a multilayer optical recording medium was produced in a step including a preliminary UV curing step in the related technology, and an example in which a multilayer optical recording medium was produced in a step including a preliminary UV curing step according to the present disclosure, the worst value of the radial tilt (a angle) and the size of the outer circumference burrs were evaluated. The size of the outer circumference burrs was evaluated by the amount of protrusion from the outer circumferential end of the disk based on the image obtained by capturing the vicinity of the outer circumference. The results are shown in Table 2.

TABLE 2

|  | Process including no preliminary UV curing step | Process including preliminary UV curing step in related technology | Process including preliminary UV curing step of present disclosure |
|---|---|---|---|
| Worst value of radial tilt (α angle) | −0.7 deg | −0.24 deg | −0.24 deg |
| Size of outer circumference burr | 0 μm | 500 μm | 0 μm |

When a multilayer optical recording medium was produced in a step including no preliminary UV curing step, no outer circumference burrs occurred, the radial tilt was −0.7 deg, which was outside the standard range. In addition, when a multilayer optical recording medium was produced in a step including a preliminary UV curing step in the related technology, the radial tilt was −0.24 deg, which was within the standard range, and outer circumference burrs (500 μm burrs) occurred. On the other hand, when a multilayer optical recording medium was produced in a step including a preliminary UV curing step according to the present disclosure, the radial tilt was −0.24 deg, which was within the standard range, and no outer circumference burrs occurred. Based on the results of Table 1, it was confirmed that the method of producing a multilayer optical recording medium according to the present disclosure was beneficial.

Next, the preliminary UV curing step was performed by changing the distance between the mask member MA and the upper disk between 0.25 mm and 2.00 mm at intervals of 0.25 mm. Here, shaking-off conditions were a rotation speed of 6,000 rpm, and a shaking-off time (rotation time) of 4 sec. The results are shown in Table 3.

TABLE 3

| Distance between mask member and upper disk [mm] | 0.25 | 0.50 | 0.75 | 1.00 | 1.25 | 1.50 | 1.75 | 2.00 |
|---|---|---|---|---|---|---|---|---|
| Contact between disk and mask member | yes | no | no | no | no | no | no | no |
| Length of outer circumference adhesive burr [μm] | Prototype not allowed | 0 | 0 | 0 | 0 | 0 | 120 | 320 |

When the distance was 0.25 mm, the mask member MA and the upper disk came into contact with each other, and the upper disk was damaged. If the distance was 0.50 mm or more, there was no contact between the mask member and the upper disk. In addition, if the distance was between 0.50 mm and 1.50 mm, the burr length was 0 μm, if the distance was 1.75 mm, 120 μm burrs occurred, and if the distance was 2.0 mm, 320 μm burrs occurred. This reason for this was speculated to be that, if the distance was large, ultraviolet rays would hit the side of the outer circumference of the disk and a masking effect of the mask member could not be obtained. Based on the above, the optimal distance was between 0.50 mm and 1.50 mm.

Modification Example

While embodiments and modification examples of the present disclosure have been described above in detail, the present disclosure is not limited to the embodiments and modification examples, but various modifications can be made based on the technical idea of the present disclosure. For example, configurations, methods, steps, shapes, materials, numerical values and the like exemplified in the embodiments and modification examples are only examples, and different configurations, methods, steps, shapes, materials, numerical values and the like may be used as necessary. The configurations, methods, steps, shapes, materials, numerical values and the like of the embodiments and modification examples can be combined with each other without departing from the gist of the present disclosure. In stepwise numerical value ranges described in the embodiments and modification examples, the upper limit value or the lower limit value of the numerical value range of a certain stage may be replaced with the upper limit value or the lower limit value of the numerical value range of another stage. Unless otherwise specified, the materials exemplified in the above embodiments and modification examples may be used alone or two or more thereof may be used in combination.

For example, the mask member MA preferably includes both the inner circumferential mask MA1 and the outer circumferential mask MA2, but may include either. In addition, the number of information signal layers, the number of intermediate layers, the number of bonded disks, a configuration example of the production device, and the like can be appropriately changed without departing from the gist of the present disclosure.

In addition, the present disclosure may also have the following configurations.

(1)
A method of producing a multilayer optical recording medium, including when a UV curable adhesive is interposed between a first disk and a second disk, the first disk and the second disk are rotated, and when at least one of the vicinities of inner circumferential edges and the vicinities of outer circumferential edges of the first disk and the second disk is masked with a mask member,
emitting ultraviolet rays for preliminarily curing the UV curable adhesive from the side of a light emission surface of the first disk during rotation.

(2)
The method of producing a multilayer optical recording medium according to (1),
wherein the mask member includes a first mask member that masks the vicinity of the inner circumferential edge and a second mask member that masks the vicinity of the outer circumferential edge.

(3)
The method of producing a multilayer optical recording medium according to (1) or (2),
wherein the distance between the mask member and the light emission surface of the first disk is 0.50 mm or more and 1.50 mm or less.

(4)
The method of producing a multilayer optical recording medium according to any one of (1) to (3),
wherein, when the ultraviolet rays are emitted, suction is performed from a suction hole provided in a center pin that holds inner circumferences of the first disk and the second disk.

(5)
The method of producing a multilayer optical recording medium according to any one of (1) to (4),
wherein, after ultraviolet rays for preliminarily curing the UV curable adhesive are emitted, when the masked state is released, ultraviolet rays for mainly curing the UV curable adhesive are emitted to the first disk and the second disk from the side of the light emission surface of the first disk and the side of the light emission surface of the second disk, respectively.

(6)
The method of producing a multilayer optical recording medium according to any one of (1) to (5),
wherein the mask member and an emission member that emits the ultraviolet rays are interlocked.

(7)
A device for producing a multilayer optical recording medium, including: an emission member that emits ultraviolet rays;
a holding unit that holds a first disk and a second disk that are laminated; and a mask member that masks at least one of the vicinities of inner circumferential edges and the vicinities of outer circumferential edges of the first disk and the second disk,
wherein, when a UV curable adhesive is interposed between the first disk and the second disk, the first disk and the second disk held by the holding unit are rotated, and
wherein, when at least one of the vicinities of the inner circumferential edges and the vicinities of the outer circumferential edges of the first disk and the second disk is masked with the mask member, ultraviolet rays for preliminarily curing the UV curable adhesive are emitted from the emission member from the side of a first main surface of the first disk during rotation.

(8)
The device for producing a multilayer optical recording medium according to (7),
wherein the mask member includes a first mask member that masks the vicinity of the inner circumferential edge and a second mask member that masks the vicinity of the outer circumferential edge.

(9)
The device for producing a multilayer optical recording medium according to (7) or (8),
wherein the emission member and the mask member are interlocked, and
wherein, after the distance between the mask member and a light emission surface of the first disk is set to 0.50 mm or more and 1.50 mm or less, ultraviolet rays are emitted from the emission member.

REFERENCE SIGNS LIST 1, 1A Disk
21 Adhesive
60 Production device
MA Mask member
MA1 Inner circumferential mask
MA2 Outer circumferential mask
100 Multilayer optical recording medium

The invention claimed is:

1. A method of producing a multilayer optical recording medium, comprising:
when a UV curable adhesive is interposed between a first disk and a second disk, the first disk and the second disk are rotated, and
when at least one of vicinities of inner circumferential edges and vicinities of outer circumferential edges of the first disk and the second disk is masked with a mask member, emitting ultraviolet rays for preliminarily curing the UV curable adhesive from a side of a light emission surface of the first disk during rotation.

2. The method of producing a multilayer optical recording medium according to claim 1,
wherein the mask member includes a first mask member that masks the vicinities of the inner circumferential edges and a second mask member that masks the vicinities of the outer circumferential edges.

3. The method of producing a multilayer optical recording medium according to claim 1, wherein a distance between the mask member and the light emission surface of the first disk is 0.50 mm or more and 1.50 mm or less.

4. The method of producing a multilayer optical recording medium according to claim 1,
wherein, when the ultraviolet rays are emitted, suction is performed from a suction hole provided in a center pin that holds inner circumferences of the first disk and the second disk.

5. The method of producing a multilayer optical recording medium according to claim 1,
wherein, after ultraviolet rays for preliminarily curing the UV curable adhesive are emitted, when a masked state is released, ultraviolet rays for mainly curing the UV curable adhesive are emitted to the first disk and the second disk from the side of the light emission surface of the first disk and the side of the light emission surface of the second disk, respectively.

6. The method of producing a multilayer optical recording medium according to claim 1,
wherein the mask member and an emission member that emits the ultraviolet rays are interlocked.

7. A device for producing a multilayer optical recording medium, comprising:
an emission member that emits ultraviolet rays;
a holding unit that holds a first disk and a second disk that are laminated; and
a mask member that masks at least one of vicinities of inner circumferential edges and vicinities of outer circumferential edges of the first disk and the second disk,
wherein, when a UV curable adhesive is interposed between the first disk and the second disk, the first disk and the second disk held by the holding unit are rotated, and
wherein, when at least one of the vicinities of the inner circumferential edges and the vicinities of the outer circumferential edges of the first disk and the second disk is masked with the mask member, ultraviolet rays for preliminarily curing the UV curable adhesive are emitted from the emission member from a side of a first main surface of the first disk during rotation.

8. The device for producing a multilayer optical recording medium according to claim 7,
wherein the mask member includes a first mask member that masks the vicinities of the inner circumferential edges and a second mask member that masks the vicinities of the outer circumferential edges.

9. The device for producing a multilayer optical recording medium according to claim 7,
wherein the emission member and the mask member are interlocked, and
wherein, after a distance between the mask member and a light emission surface of the first disk is set to 0.50 mm or more and 1.50 mm or less, ultraviolet rays are emitted from the emission member.

* * * * *